Aug. 12, 1930.   T. W. CULMER   1,772,985
METHOD OF SWEETENING PETROLEUM HYDROCARBONS
Filed March 1, 1928
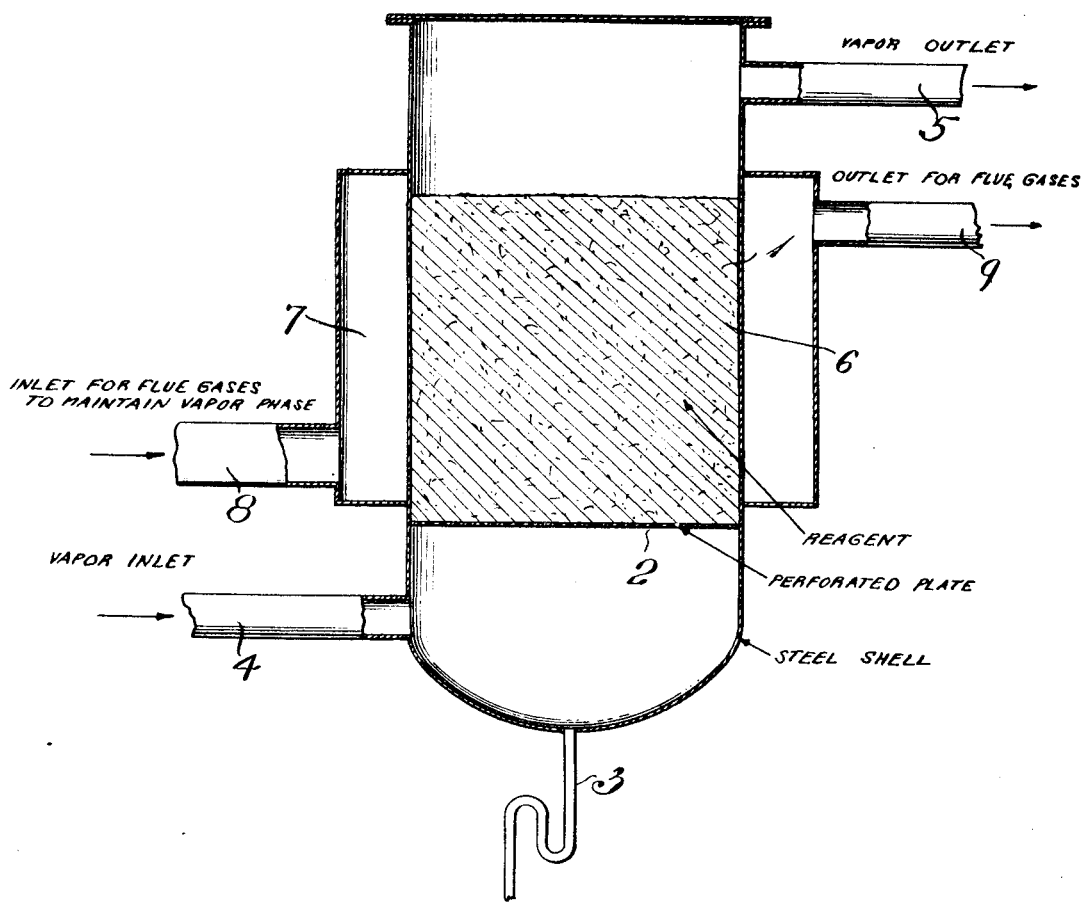
Inventor
T. W. Culmer
by Gordon Stewart
Attorneys Patented Aug. 12, 1930

1,772,985

UNITED STATES PATENT OFFICE

THADDEUS W. CULMER, OF ROBINSON, ILLINOIS, ASSIGNOR TO LINCOLN OIL REFINING COMPANY, OF FINDLAY, OHIO, A CORPORATION OF DELAWARE

METHOD OF SWEETENING PETROLEUM HYDROCARBONS

Application filed March 1, 1928. Serial No. 258,415.

This invention relates to the purification of petroleum or hydrocarbon compounds and specifically deals with the problem of sweetening the volatile fractions such as gasoline. Dependent upon the source of the crude oil and its mode of refinement, the gasoline as produced is frequently found to have present objectionable compounds which affect adversely the color or odor of the gasoline. It is an object of my invention to react upon the gasoline in the state of vapor and preferably incidental to its-production, with certain chemicals in solid form which serve to remove or destroy the obnoxious odor.

Another object of my invention is to improve the color of the gasoline produced, and render the color stable.

A further object in view is to develop a form of solid reacting material with which the vapor of the petroleum oil may be brought into intimate contact, the material remaining in the desired form and of full efficiency over a relatively long period.

Where the material becomes impaired through extensive use, it may be readily revivified by my process, without removal from the reacting chamber.

The particular selection made of reacting substances is such as to maintain them in the proper and desirable form of solid aggregates, while exhibiting and preserving the alkalinity found necessary to obtain the best results of sweetening the petroleum oils. Furthermore, substances are incorporated in the material to serve as catalysts and to preserve the material against deterioration through the production of side reactions.

Primarily the invention consists in employing a mixture of one or more oxides fused together with a caustic and then reduced to small aggregates of large surface over which the petroleum vapors are passed at appropriate temperatures and pressures. As illustrating one preferred form of device exemplifying my process, I have shown diagrammatically in the accompanying drawing a reaction chamber 1, of any suitable size and form. Across the lower end of this chamber there is provided a perforated plate 2 forming a false bottom.

The extreme lower end is fitted with a trap and drain 3 by which condensed vapors may be drawn off for return to the system, in the event that such condensation is permitted. A vapor inlet 4 is arranged at one side of the chamber below the plate 2, while a vapor outlet 5 is disposed in the opposite chamber wall near its top.

The greater part of the space within the chamber and above the plate 2 is occupied by the reagent 6, to be described later.

A heating jacket 7 is fitted around the mid portion of the chamber opposite the mass of reagent. This jacket is supplied with flue gases through inlet 8 and the gases are discharged through outlet 9 after having supplied heat to the reagent in sufficient quantity to maintain the oils in the vapor phase. Suitable means, not illustrated, are provided for charging the chamber with the reagent and for removing the latter when desired, it being also apparent that the material may be revivified while in the chamber by the passage therethrough of gases such as superheated air, superheated steam or ammonia.

The material used in this chamber is a closely packed, finely ground mass of a fusion of one or more oxides with caustic soda. Any oxide which will supply oxygen during the process may be used and among those found suitable are lead oxide (litharge), red lead, lead peroxide, zinc oxide, manganese dioxide and copper oxide. In addition calcium hydroxide, aluminum hydroxide and either crude or refined bauxite will serve this purpose when fused with caustic soda.

One or more of these oxides are fused with caustic soda in approximately molecular proportions, and the resultant mass cooled, crushed to small particles and charged into the chamber. This forms a porous, dry mass through which the vapors of hydrocarbon oils may be filtered upwardly. During the passage of the vapor the temperature of the chamber is maintained at from 50° to 600° F. and the pressure can be atmospheric or elevated to as much as six hundred pounds per square inch. It is found that increase of heat or pressure serves to accelerate the chemical reaction.

As the vapor is forced through the filtering reagent, the latter may absorb the obnoxious impurities, or may enter into chemical combination with them. The latter action may partake of an oxidation due to the activity of the metallic oxides in the presence of the strong alkali. It is also to be considered that where one of the substances such as aluminum hydroxide or its compounds is fused with a lead oxide and caustic soda it serves as a catalyst, while the lead oxide is prevented from forming lead sulphide and thus losing its further properties as a sweetening agent.

In the event that further alkalinity is found desirable, a small quantity of dry ammonia gas is fed through the chamber along with the hydrocarbon vapors. The ammonia is capable of maintaining the fused, granular mass effective over a longer period than would otherwise result. In like manner the ammonia gas may be introduced optionally as a separate or revivifying step when the mass becomes exhausted.

It will be apparent from the above that the invention is primarily an improvement in the sweetening of hydrocarbon oils in the state of vapor rather than liquid. This avoids the necessity of treating the liquid oils with reagents that must subsequently be removed. In addition the oxides, by fusion with caustic soda are converted into compounds from which oxygen will be readily supplied for combining with the oil vapors.

Numerous changes in proportions and analogous substances will occure to those skilled in this art as coming within the scope of the invention defined in the appended claims.

What I claim is:

1. The process of purifying hydrocarbon oils which consists in bringing the vapors thereof into contact with an oxide of lead which has been fused with aluminum hydroxide and caustic soda.

2. The process of purifying hydrocarbon oils which consists in bringing the vapors thereof into contact with a porous mass containing an oxide of lead which has been fused with caustic soda and supplying ammonia gas to the reacting materials.

In testimony whereof, I affix my signature.

THADDEUS W. CULMER.